UNITED STATES PATENT OFFICE.

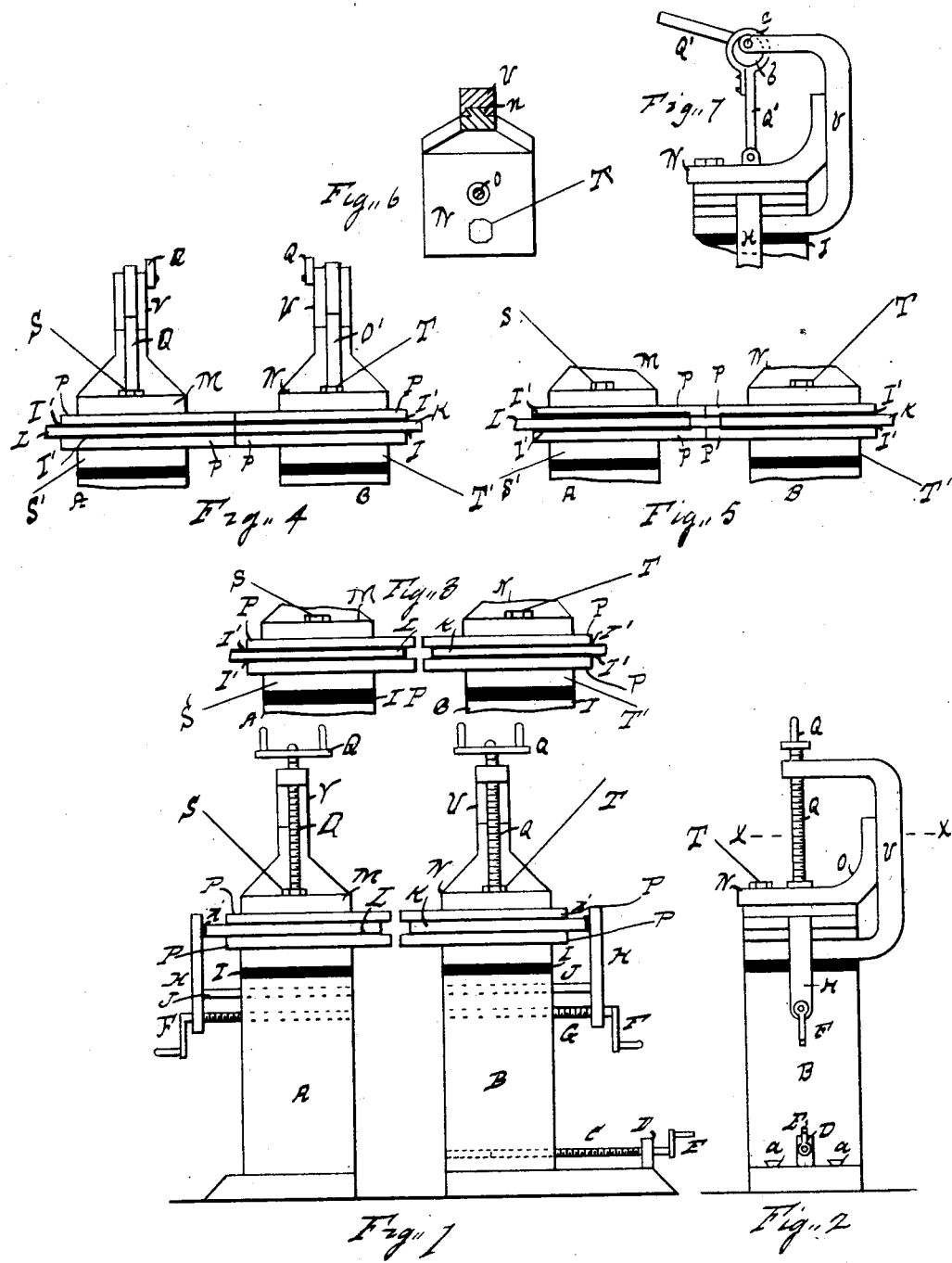

CHARLES L. COFFIN, OF DETROIT, MICHIGAN.

METHOD OF WELDING METALS BY ELECTRICITY.

SPECIFICATION forming part of Letters Patent No. 423,735, dated March 18, 1890.

Application filed December 6, 1889. Serial No. 332,784. (No model.)

*To all whom it may concern:*

Be it known that I, CHARLES L. COFFIN, of Detroit, in the county of Wayne and State of Michigan, have invented a new and useful Improvement in Welding Metals Electrically, of which the following is a specification.

My invention consists in a mode of welding metals electrically, hereinafter fully described and claimed.

The drawings illustrate mechanism by which my invention may be practiced.

Figure 1 is a side view of a complete apparatus. Fig. 2 is an end elevation thereof. Figs. 3, 4, and 5 are partial side elevations. Fig. 6 is a section on line $x\,x$, Fig. 2; and Fig. 7 is a partial end elevation showing an eccentric for operating the clamp instead of a screw.

My present invention relates more particularly to welding thin metals, which would be wholly or partially destroyed by the direct action of the heating-current or voltaic arc; and it consists, generally speaking, in bringing the metal to a welding heat by inclosing the same between electrically-heated conductors.

A and B represent standards mounted on suitable clamps, one or both of which, as B, Fig. 1, is made movable on its standard in any suitable way, as by the dovetailed groove and projections $a\,a$, Fig. 2.

D represents a lug on the base of the machine, in which is swiveled a screw-shaft C, provided with a crank E and threaded into standard B, whereby said standard may be moved to or from the standard A at will.

For the purpose of pressing the articles to be welded together, I have illustrated the pressure-bar H, having a guide J, sliding in the standard and having a screw-shaft F slipped through the pressure-bar and engaging with the thread in the hole tapped in the standard, whereby the bar H may be moved and its upper end pressed against the articles to be welded.

Secured to the top of each standard A and B, but insulated therefrom by the insulating material I, is a clamp. The mechanical construction of this clamp is of not much importance, and that which I have illustrated is as follows:

V represents a U-shaped plate, one end of which is secured to the top of the standard, the other end rising above and passing over the standard, as clearly shown in Figs. 2 and 7, and the lower end of V forms the lower clamp.

N represents the upper plate of the clamp, having at its end an upper extension O, on which is formed a projecting dovetail $n$, Fig. 6, taking into a similar groove in the upright part of V.

N and V are insulated from each other throughout, as though there is no electrical connection between them, when, as indicated in the drawings, the two parts of the clamp are connected with the poles of a generator; but the same result may be obtained by insulating the two parts of the clamp from the things contained between them, when it is immaterial whether A and B are insulated from each other.

Q represents a screw-shaft provided with any suitable means for rotating the same, tapped through the upper part of the plate B, and swiveled into plate N, by means of which the plate N may be raised or lowered.

K and L represent two articles to be welded together.

P P represent plates of conducting material, (preferably carbon,) between a pair of which in each clamp the articles K and L to be welded are held, the said plates P in Fig. 1 having no insulation between themselves and the articles K and L, but in Figs. 3, 4, and 5 being insulated therefrom by the strips of insulating material I′, placed between the plates P and the articles K and L.

S and T represent electrical conductors by which the upper plates N of the two clamps are connected with the opposite poles of a generator of electricity.

When the plates N and V are insulated from each other and the plates P are insulated from the articles K and L to be welded, I connect the plates N and V of one clamp with one pole of a generator by the conductors T and T′ and the plate N and V of the other clamp with the other pole of a generator by conductors S S′, as shown in Figs. 3, 4, and 5; or T and S may be one circuit and T′ S′ another circuit.

In the arrangement shown in Figs. 1 and 3 the opposite plates P of the two clamps are not in contact and the articles K and L to be welded do not reach the ends of the plates P.

The operation of this arrangement is as follows: The ends of the plate P are brought into contact and slightly separated, whereby a voltaic arc is formed between the opposite upper plates P and also between the opposite lower plates P, thus heating the ends of said plates, and thereby heating by contact the interposed articles K and L to be welded. When articles K and L have reached a welding heat, they are pressed together to form the weld by rotating the screw-shaft F, which causes the bars H to press K and L together. The shaft E may be moved to draw A and B apart to give space for the working of joint at K and L when they are pressed together.

The bars H are provided at their upper ends with insulating material $i$. In the arrangement shown in Fig. 4 the opposite upper plates P and the opposite lower plates P are in contact and the articles K and L are in contact. In this arrangement the plates P are heated by passing heating-currents through them, and they heat the articles K and L by contact, and when K and L are sufficiently heated they are pressed together, as before.

The arrangement in Fig. 5 is the same as that of Fig. 4, except that K and L are not in contact and are pressed into contact when sufficiently heated through the heating of the upper and lower plates P by the passage of a heating-current.

The insulation I' may be of a refractory material which will not be destroyed at the temperature necessary to bring K and L to a welding heat. When the weld is cold, or while cooling, it may be finished by rolling, hammering, or any other desired way.

In the arrangement shown in Fig. 7 I substitute an eccentric $b$, pivoted to the upper end of the plate B by a pin $c$ and connecting with the plate N by a strap and connecting-rod Q', this being a mechanical equivalent for the screw-shaft Q for this purpose.

What I claim as my invention, and desire to secure by Letters Patent, is—

The herein-described method of welding metals electrically, consisting in inclosing the articles to be welded between conductors, electrically heating the inclosing-conductors, and forming the weld by pressing together the articles to be welded when brought to a welding heat.

CHARLES L. COFFIN.

Witnesses:
HENRY B. LOTHROP,
GERTRUDE ANDERSON.